United States Patent [19]

Gossard

[11] Patent Number: 4,593,766
[45] Date of Patent: Jun. 10, 1986

[54] STRAFING PIT CONDITIONING APPARATUS WITH MAGNETIC SWEEPER

[76] Inventor: Gordon G. Gossard, 16263 Cabrillo Dr., Victorville, Calif. 92392

[21] Appl. No.: 671,937

[22] Filed: Nov. 16, 1984

[51] Int. Cl.$^4$ .......... B66C 1/06; A01B 43/00; B03C 1/00
[52] U.S. Cl. .................. 171/63; 15/1.5 R; 15/3; 15/4; 37/DIG. 3; 89/1.13; 171/105; 171/18; 172/196; 172/198; 172/199; 172/438; 209/215; 414/737; 414/912
[58] Field of Search .......... 172/44, 698, 136, 146, 172/438, 145, 200, 197, 199, 198, 196, 684, 684.5, 766; 171/18, 83, 84, 105, 104, 110, 136, 63, 64, 65; 89/1.1, 1.13; 102/402; 294/65.5; 209/215; 15/4; 414/724, 737, 680, 912; 37/DIG. 3

[56] References Cited

U.S. PATENT DOCUMENTS

| | | | |
|---|---|---|---|
| 376,841 | 1/1888 | Albaugh | 172/145 |
| 1,124,847 | 1/1915 | Brewer | 172/684.5 X |
| 2,629,495 | 2/1953 | Smale | 209/215 |
| 2,714,454 | 8/1955 | Votz | 209/215 |
| 2,759,604 | 8/1956 | Carpenter | 209/215 |
| 2,820,405 | 1/1958 | Puckett | 172/200 |
| 2,874,490 | 2/1959 | Harmon | 172/797 X |
| 2,920,405 | 1/1960 | Cole | 172/449 X |
| 2,964,863 | 12/1960 | Shepherd | 172/136 X |
| 3,260,003 | 7/1966 | Rolfe | 172/136 |
| 4,323,329 | 4/1982 | Chlad | 294/65.5 X |

FOREIGN PATENT DOCUMENTS

| | | | |
|---|---|---|---|
| 603295 | 4/1926 | France | 171/63 |
| 90103 | 8/1937 | Sweden | 294/65.5 |

*Primary Examiner*—Richard J. Johnson
*Assistant Examiner*—Terrence L. B. Brown
*Attorney, Agent, or Firm*—John H. Crowe

[57] ABSTRACT

A crawler tractor with a dozer blade and fitted with accessories to loosen the ground in the strafing pit area of an Air Force gunnery range and simultaneously remove from the ground rocks the size of a man's fist and larger and spent projectiles. The tractor is provided with an electromagnet positioned ahead of the dozer blade. Positioned to the rear of the tractor, and pivotally attached to its frame by drawbars, is a chisel bar with a plurality of chisel blades. Just ahead of the chisel bar is a rock rake having a spine from which extend a plurality of forwardly projecting tines. The rake is supported with its tines at such an angle that their tips barely scrape the surface of the earth. Ahead of the rock rake, there is a drag consisting of a section of railroad rail suspended from the drawbars of the chisel assembly at a height sufficient to just scrape the surface of the ground during operation of the tractor. Operation of the tractor and its accessories in the strafing pit of an Air Force gunnery range thus accomplishes three operations, namely, loosening of the earth to soften it so that it can better absorb the impact of projectiles from flying aircraft using the gunnery range, the removal of rocks from the area to minimize the possibility of ricochets of projectiles fired by the aircraft and the removal of spent projectiles from previous target runs to further minimize the possibility of projectile ricochets.

8 Claims, 2 Drawing Figures

STRAFING PIT CONDITIONING APPARATUS WITH MAGNETIC SWEEPER

BACKGROUND OF THE INVENTION

This invention relates generally to means for maintaining the strafing pit areas of Air Force gunnery ranges in proper condition to minimize the risk of projectile ricochet damage to aircraft utilizing the ranges for gunnery practice.

The U.S. Air Force maintains a number of gunnery ranges for use in the practice firing of relatively small caliber armament on jet aircraft. All such ranges include strafing pits, a strafing pit being an area where an unfurled drag chute target is suspended on poles above the ground for low flying planes to shoot at as they overfly it. Such strafing pits are used primarily for firing practice with 20 and 30 mm guns. If the ground area of a strafing pit is hardpacked or contains rocks and spent shells from previous target runs, some of the fired projectiles from a plane coming in at a low angle to shoot at the target can ricochet upwardly into the path of the fast moving plane and thereby pose a danger to the aircraft and its pilot. Such ricochets can even cause plane crashes and pilot deaths. Consequently, efforts have been made by the Air Force to maintain the ground surface areas of strafing pits in condition to minimize the possibility of such ricocheting and risk of injury or death to pilots and destruction of highly sophisticated and costly jet aircraft. Such efforts, however, have not met with great success.

Past efforts to increase the safety of strafing pit areas have involved disking operations to loosen and soften the earth in such areas, but such disking was found to be extremely time consuming, taking, for example, from 1½ to 2 days to cover the ground from 150 feet in front of the target to 200 feet behind it (the area to be maintained under Air Force requirements.) Heretofore any rocks turned up by the disking operation were removed by hand, an extremely slow and inefficient way of going about it. The removal of spent projectiles from strafing pits with an electromagnet has been considered in the past, but never successfully carried out. For one thing, no satisfactory method of transporting the magnet, which was quite heavy, across the soft, disked earth, characterized by areas of varying density, was ever found. Moreover, I have determined that the type of electromagnet heretofore contemplated for use in the magnetic sweeping of strafing pits was underpowered and probably incapable of removing spent projectiles from strafing pit areas even if a way had been found to move it over such areas while maintaining it at optimum height above ground level for the purpose.

For the above reasons, previous attempts to maintain strafing pit areas in Air Force gunnery ranges in proper condition to minimize ricochets during target runs for purposes of safety have been not only costly, but inefficient and only partly effective.

SUMMARY OF THE INVENTION

I have now, by this information, provided an apparatus or machine and method for simultaneously loosening and softening the ground in strafing pit areas of Air Force gunnery ranges, removing rocks large enough to cause the ricocheting of projectiles fired from aircraft and removing spent projectiles from previous aircraft practice runs. Not only can these three operations be simultaneously accomplished with my novel apparatus, but all three can be carried out in a mere fraction of the time heretofore required for a disking operation alone. More specifically, the operator of the machine can prepare the ground in a strafing pit area for subsequent target practice with minimal risk of projectile ricochets in from 3 to 3½ hours, by comparison with the 1½- to 2-day requirement for merely carrying out the disking operation heretofore employed unaccompanied by any removal of rocks or spent projectiles from the area.

In one form, the novel strafing pit conditioning machine of this invention comprises a crawler tractor with a dozer blade in combination with certain accessories for ground maintenance functions as will be described. In a preferred embodiment, these accessories include an electromagnet supported in a position ahead of the tractor. Extending to the rear of the tractor, and connected to it by appropriate drawbar means, is a chisel bar with spaced chisel blades attached, a rock rake with a plurality of tines and a drag. The chisel bar is mounted farthest to the rear of the tractor body and is controlled by appropriate lifting means for adjusting the depth of penetration of the chisel blades into the earth. The rock rake is supported just ahead of the chisel blades on the drawbar means at an angle such that the forward tips of its tines barely scrape the ground surface to scoop up any rocks too large to pass between the tines. Suspended from the drawbar means ahead of the rock rake is a heavy transverse drag to help level out any excessively high or low spots in the softened strafing pit terrain.

In use, my novel tractor apparatus with its ground conditioning accessories is driven back and forth across a strafing pit area in a direction perpendicular to the line of flight of aircraft using the strafing pit for target practice. This dierection of movement is mandated by an Air Force requirement based on the proposition that there is less possibility of ricochets when the earth is furrowed in that direction than when its furrows are in line with the direction of flight of the aircraft. As the tractor moves transversely across the strafing pit, the electromagnet picks up spent projectiles in the path of movement of the tractor. The drag moves in light contact with the earth's surface behind the tractor and behind it the rock rake scoops up those rocks large enough to be ricochet risks and carries them in rolling and tumbling contact with its tines. Behind the rock rake, the chisel blades loosen the earth as the tractor moves ahead. The tractor operator turns off the electromagnet at an appropriate place for discharge of its burden of spent projectiles, and the chisel drawbar assembly is tilted upwardly for discharge of the rocks from the rock rake when such discharge is desired. The strafing pit area is crisscrossed by the tractor until its ground surface has been loosened throughout and dangerous rocks and spent projectiles have been removed therefrom.

DESCRIPTION OF THE PREFERRED EMBODIMENT

Figure 1:
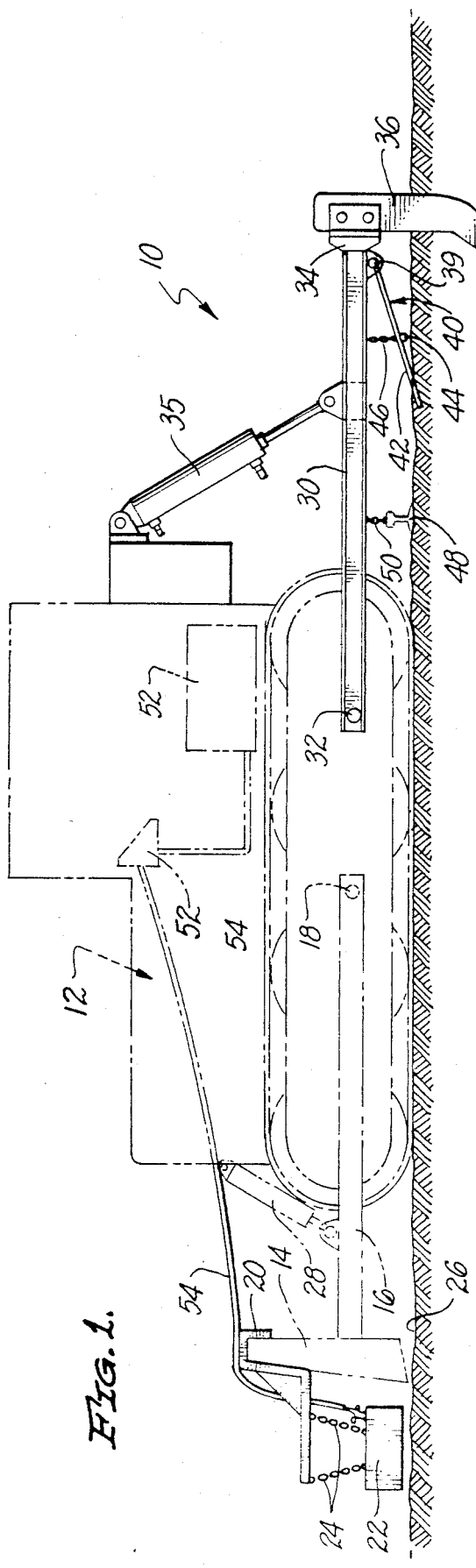
FIG. 1 is a side elevational view of a preferred embodiment of my novel machine for maintaining the strafing pit area of an Air Force gunnery range in condition for firing practice with minimal risk of ricochet damage to low flying aircraft using the range, conventional parts of a crawler tractor forming part of the machine being shown in phantom-line outline for better illustrative effect.
Figure 2:
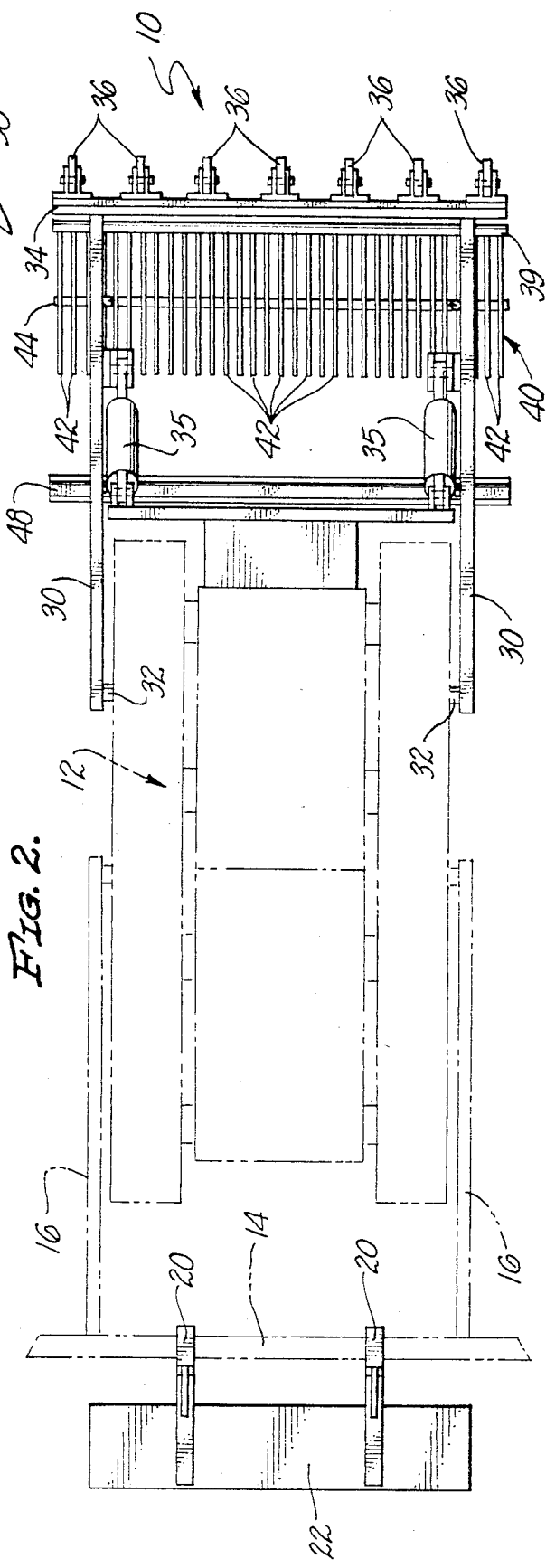
FIG. 2 is a top plan view of the FIG. 1 machine.

Considering now the drawing in greater detail, the aforesaid machine is illustrated generally at 10 in FIGS. 1 and 2. The machine 10 comprises a conventional crawler tractor 12 having a dozer blade 14 mounted thereon for vertical swinging movement by means of a pair of push arms 16 pivotally attached to the tractor frame at 18. Suspended from a pair of hangers 20, supported by the dozer blade 14 as shown, is an electromagnet 22. the electromagnet is suspended from the hangers 20 by four chains, two of which can be seen at 24 in FIG. 1. These chains are of such length as to position the bottom of the electromagnet about four inches above ground level, shown at 26, when the bottom of the dozer blade is about the same distance above the ground. The actual distance of the electromagnet above the ground can be adjusted through vertical adjustment of the dozer blade position by hydraulic lifting means 28 forming a part of the tractor.

A pair of drawbars 30 are pivoted to opposite sides of the tractor frame at 32, and extend rearwardly therefrom to rigid connection with a chisel bar 34 carrying seven chisel shanks 36 with replaceable gripper points 38 on their lower ends. Hydraulic lifting means 35 are pivotally secured to the drawbars 30 to permit raising and lowering of the chisel assembly as circumstances require. The position of that assembly for normal use is substantially as illustrated in FIG. 1, with the drawbars 30 roughly parallel to the earth's surface and the chisel blades (shanks with attached gripper points) embedded in the ground, as shown, to a depth of about 12 inches.

Pivotally attached to the chisel assembly, slightly forward of the chisel shanks, is the spine 39 of a rock rake 40. The rock rake has a plurality of relatively closely spaced, parallel tines 42 extending in the direction of movement of the tractor and downwardly angled from the plane of the drawbars 30 so that their forward ends barely penetrate the earth as the tractor moves ahead. The tines 42 are supported at the proper angle with the ground for such penetration (about 30° as seen in FIG. 1) by a rib 44 extending transversely thereunder intermediate the ends of the tines which is, in turn, supported by a pair of spaced chains 46 attached to the drawbars. The angle of the tines can, of course, be adjusted, through adjustment of the lengths of the chains 46, to permit them to most effectively comb the ground and pick up and convey rocks out of a strafing pit area for dumping. The tines are spaced to retain rocks the size of a man's fist and larger, in accordance with Air Force requirements.

The chisel shanks are of conventional type and preferably spaced about 16½ inches apart along the chisel bar. The spine 39 of the rock rake can be made of a relatively soft metal such as mild steel, but the tines 42 must be of a hard metal such as, for example, hardened stainless steel, drill steel, or the like, to adequately withstand the rugged service conditions to which they are subjected in use.

Suspended from the drawbars of the chisel assembly, between the rock rake and tractor body, is a heavy drag element 48. This drag element extends transversely of the path of travel of the tractor and is preferably a section of railroad rail of a length approximately equivalent to the width of the rock rake 40. It is suspended so as to barely scrape the surface of the ground ahead of the rock rake by means of a pair of chains 50 supported by the drawbars 30. Here again, as in the case of the chains 46 supporting the tines of the rock rake intermediate their ends, the chains 50 can be adjusted in length to suit particular operating requirements.

The manner in which the apparatus or machine 10 functions, and the results it achieves, should now be clear. As previously indicated, the machine was specifically designed to satisfy Air Force strafing pit maintenance needs. There are a number of Air Force gunnery ranges with strafing pits in this country and other parts of the world, all of which must be maintained in accordance with strict specifications, which include a weekly plowing, chiseling or disking of the strafing pit area to a minimum depth of 12 inches to provide a soft bed to absorb fired projectiles with minimum danger of ricochet. The earth's surface is to be kept level in the strafing pit areas, and all rocks the size of a man's fist or larger, as well as all spent projectiles, are to be removed therefrom on a weekly basis. As previously indicated, all earlier attempts to maintain the ground sufficiently soft to satisfy Air Force requirements have involved disking, rather than plowing or chiseling, procedures which proved to be very time consuming. Also as noted earlier, the removal of rocks, prior to the introduction of my novel ground maintenance technique and machine, was done by hand, an unacceptably slow and imperfect procedure. On top of that, magnetic sweeping efforts heretofore considered by the Air Force employed, as previously indicated, an electromagnet of insufficient power to do the job properly. Moreover, these efforts bore no fruit because of a lack of any effective way of moving the electromagnet across the soft ground of strafing pit areas with its density variations. My novel machine succeeds in doing all of these things (softening the ground, removing rocks and electromagnetically removing spent projectiles) in a single operation, and accomplishing this in a mere fraction of the time it previously took to merely disk a strafing pit area with no removal of any rocks or spent projectiles therefrom.

I have solved the problem of transporting a heavy electromagnet across the soft ground of Air Force strafing pits by employing an endless track tractor as the prime mover for my novel ground conditioning apparatus. Because of the relatively large tread area of such a tractor, it serves, in a sense, as a flotation device exerting relatively low pressure, in pounds per square inch, on the ground. Although "low ground pressure" endless track tractors having larger than normal tread areas are commercially available, it is not necessary to emply such a vehicle for my purpose since I have found an ordinary crawler tractor to be adequate for that purpose (although the use of such a low ground pressure tractor is within the scope of my invention). A wheeled vehicle exerts much higher localized pressure on the ground than the treads of a crawler tractor, and also leaves fairly deep tracks in the soft strafing pit earth, by contrast with the substantial absence of tracks in the wake of the tractor moving over such ground.

I have discovered that in order to achieve proper magnetic intensity to pick up spent projectiles in Air Force strafing pits, an electromagnet is preferable to a permanent magnet. Permanent magnets have been used in some magnetic sweeping operations in the past, as, for example, airport runway sweepings where such small items as nails and the like are to be picked up. It is not possible, however, to get the kind of intensity that an electromagnet provides with a permanent magnet.

While, as indicated above, the Air Force has considered the use of an electromagnet for the sweeping of strafing pit areas, that magnet had a 3-horsepower energy source and was of relatively low intensity. By contrast, I have found a 16-horsepower drive for my electromagnet to be barely suitable for my purpose. Of critical importance, insofar as my electromagnet is concerned, is the height of the magnet above the ground surface during a ground sweeping operation. As I have indicated, my preferred electromagnet is powered by a 16-horsepower motor, which drives a generator producing 125 volts and 40 amps of electricity to induce a proper level of magnetic flux intensity in the magnet for my purpose. I have found that maintenance of this magnet 4 inches above ground level is optimum for that purpose. It is important to carefully control this distance above ground level, because the flux intensity of a magnet at any point varies inversely with the square of the distance of that point from the magnet. Under the circumstances, it seems unlikely that the 3-horsepower electromagnet formly considered for use by the Air Force would have had a powerful enough magnetic flux intensity at ground level to pick up spent projectiles, even if a way of moving it across the soft ground of uneven density in strafing pits had been discovered and the magnet were employed at a distance no greater than about one inch above ground level. The motor, generator, switch and controls for electromagnet 22 are mounted in the cab of tractor 12 within reach of the operator, and interconnectd with the electromagnet by appropriate wiring. The location of these cooperating units of the electromagnet system is indicated at 52, and the wiring at 54, in FIG. 1 of the drawing. The electromagnet system itself is of conventional character and the units comprising that system are available commercially.

When it is time to dump a load of rocks picked up by the rock rake or metal projectiles adhering to the electromagnet of the machine 10, tractor 12 is driven to the edge of a stafing pit area being worked and the chisel assembly is then swung upwardly around the pivots 32 by means of hydraulic cylinders 35 until the drawbars 30 are at an angle of 35° or 40° with the horizontal. The rock rake tines 42 are then at an angle of 65° or 70° with the horizontal and the rocks on the tines fall off under the influence of gravity. The electromagnet can be switched off by the tractor operator to dump any spent projectiles adhering thereto at such a dump site.

While the novel strafing pit maintenance machine of this invention has been herein illustrated and described in what is considered to be a preferred embodiment, it should be understood that various departures may be made therefrom within the scope of the invention. Certain of these departures have already been mentioned, and others will occur to those skilled in the art in the light of present teachings. For example, the controls for adjusting the positions of the dozer blade and chisel assembly could be cable, rather than hydraulic, controls, or one set of controls could be cable and the other hydraulic if desired. Or, the dozer blade could be removed from the crawler tractor and some other means of supporting the electromagnet in a position ahead of the tractor could be employed in lieu of the illustrated method of support on the dozer blade. It is not necessary that the order of alignment of the ground working accessories on tractor 12 be the same as illustrated in the attached drawing, but only that they all be present in some order on the tractor. For example, the electromagnet could be in back of the tractor, rather than in the front as illustrated.

In summary, the scope of the present invention extends to all variant forms thereof encompassed by the language of the following claims.

I claim:

1. Ground conditioning means for maintaining the strafing pit area of an aircraft gunnery range in good condition for target practice with reduced risk of projectile ricochet during such practice, comprising:

crawler tractor means;

magnetic sweeper means carried by the crawler tractor means including an electromagnetic extending crosswise of the path of movement of said crawler tractor means, support means for holding the electromgnet above the ground surface and control means operable by the tractor operator for adjusting the distance of the electromagnet above the ground to a desired level for recovering spent projectiles from a strafing pit area being traversed by said crawler tractor means;

ground breaking means pivotally supported on the crawler tractor means for penetrating and loosening the earth in said strafing pit area;

power means on said crawler tractor means for raising and lowering the ground breaking means;

rock rake means on said crawler tractor means having a plurality of tines pointing in the direction of movement of the crawler tractor means and angled to rake the ground surface, pick up rocks therefrom, and convey the rocks away from the strafing pit area when the crawler tractor means is in operation; and drag means comprising a relatively heavy crossbar positioned crosswise of the path of travel of said crawler tractor means and suspension means for supporting said crossbar on said ground conditioning means at a level to ride in contact with the ground during operation of said ground conditioning means;

whereby the ground conditioning means simultaneously digs into and softens the earth in a strafing pit area and leaves it substantially free of any rocks and spent projectiles from prior aircraft target practice runs which could cause projectiles to ricochet into the flight paths of future aircraft performing such runs.

2. Ground conditioning means in accordance with claim 1 in which said electromagnet is mounted in front of the crawler tractor means so as to precede it during operation of said ground conditioning means.

3. Ground conditioning means in accordance with claim 1 in which said ground breaking means is positioned aft of said crawler tractor means.

4. Ground conditioning means in accordance with claim 2 in which said ground breaking means is positioned aft of said crawler tractor means.

5. Ground conditioning means in accordance with claim 4 in which said rock rake means and said drag means are positioned between the crawler tractor means and the ground breaking means.

6. Ground conditioning means in accordance with claim 5 in which said rock rake means is positioned aft of said drag means.

7. Ground conditioning means in accordance with claim 6 in which said ground breaking means comprises a plurality of chisels mounted on a chisel bar.

8. Ground conditioning means in accordance with claim 7 in which said drag means is a section of railroad rail.

* * * * *

UNITED STATES PATENT AND TRADEMARK OFFICE
CERTIFICATE OF CORRECTION

PATENT NO. : 4,593,766

DATED : June 10, 1986

INVENTOR(S) : GORDON G. GOSSARD

It is certified that error appears in the above-identified patent and that said Letters Patent is hereby corrected as shown below:

Column 1, line 61, change "information" to --invention--. Column 2, line 36, "dierection" should be --direction--. Column 5, line 21, change "formly" to --formerly--. Column 6, line 13, "electromagnetic" should be --electromagnet--; and lines 15 and 16, change "electromgnet" to --electromagnet--.

Signed and Sealed this

Ninth Day of August, 1988

Attest:

DONALD J. QUIGG

*Attesting Officer*   *Commissioner of Patents and Trademarks*